(12) United States Patent
Katchmart et al.

(10) Patent No.: US 8,854,761 B1
(45) Date of Patent: Oct. 7, 2014

(54) METHOD AND SYSTEM FOR SPECIFYING SELF-SERVO-WRITE PATTERNS

(71) Applicant: Marvell International Ltd., Hamilton (BM)

(72) Inventors: Supaket Katchmart, San Jose, CA (US); David Liaw, Newark, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/041,048

(22) Filed: Sep. 30, 2013

Related U.S. Application Data

(60) Provisional application No. 61/712,653, filed on Oct. 11, 2012.

(51) Int. Cl.
*G11B 5/02* (2006.01)
*G11B 21/10* (2006.01)

(52) U.S. Cl.
CPC .................................. *G11B 21/106* (2013.01)
USPC .............. 360/55; 360/39; 360/48; 360/77.08

(58) Field of Classification Search
None
See application file for complete search history.

(56) References Cited

U.S. PATENT DOCUMENTS 7,057,842 B2 * 6/2006 Chung et al. ..................... 360/75
8,320,222 B2 * 11/2012 Nakano et al. ............. 369/47.32

* cited by examiner

*Primary Examiner* — Muhammad N Edun

(57) ABSTRACT

A method of writing servo data to a data storage medium includes reading a servo instruction from a memory, the servo instruction comprising a control portion and a data portion, processing the servo instruction in a controller to generate a servo data pattern from the data portion based on the control portion, and transferring the servo data pattern to the data storage medium. The processing may include transforming the data portion into the servo data pattern based on the control portion. The processing also may include following a command in the control portion to use the data portion as an index to retrieve a pre-programmed servo data pattern from a pattern store. The transferring may include storing the servo data pattern in a buffer, and writing the servo data pattern from the buffer to the data storage medium.

21 Claims, 4 Drawing Sheets

METHOD AND SYSTEM FOR SPECIFYING SELF-SERVO-WRITE PATTERNS

CROSS REFERENCE TO RELATED APPLICATION

This claims the benefit of, and priority to, commonly-assigned U.S. Provisional Patent Application No. 61/712,653, filed Oct. 11, 2012, the contents of which are hereby incorporated by reference herein in their entirety.

FIELD OF USE

This disclosure relates to data storage systems of the type in which read and write heads move over tracks of data on a storage medium.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In systems of the type mentioned above, the information is generally recorded in a plurality of concentric circular or spiral paths or tracks on the disk. The head that writes data to and/or reads data from the disk must follow particular ones of these tracks in order to write data to or read data from the disk.

In order to read desired information from the disk, the read head must be properly located over the track containing that desired information. To facilitate such read-head positioning, the disk is also recorded with several radially extending and angularly spaced "servo wedges" of information that contain track-identifying information, and also information that can be used to control the read-head-positioning mechanism to optimally center the read head over the desired track, especially in the direction that is radial of the disk (e.g., position error signals, or "PESs").

Servo wedge information is typically recorded on a storage medium at the time of manufacture. One technique for recording servo wedge information is "self-servo write" ("SSW"), in which the storage device's own read/write mechanisms, including data channel controllers and read/write heads, are used to write the servo wedge information under control of an external processor. The servo patterns to be written typically are created by hard coding, or by specialized circuits or complex state machines.

SUMMARY

In accordance with this disclosure, there is provided a method of writing servo data to a data storage medium. The method includes reading a servo instruction from a memory, the servo instruction comprising a control portion and a data portion, processing the servo instruction in a controller to generate a servo data pattern from the data portion based on the control portion, and transferring the servo data pattern to the data storage medium.

In a further implementation according to this disclosure, the processing includes transforming the data portion into the servo data pattern based on the control portion.

In a further implementation according to this disclosure, the processing includes following a command in the control portion to use the data portion as an index to retrieve a pre-programmed servo data pattern from a pattern store.

In a further implementation according to this disclosure, the transferring includes storing the servo data pattern in a buffer, and writing the servo data pattern from the buffer to the data storage medium.

In accordance with this disclosure, there also is provided apparatus for writing servo data to a data storage medium. The apparatus includes a memory that stores a servo instruction, the servo instruction comprising a control portion and a data portion, a controller that reads the servo instruction from the memory, processes the servo instruction to generate a servo data pattern from the data portion based on the control portion, and transfers the servo data pattern to the data storage medium.

In a further implementation according to this disclosure, the controller processes the servo instruction by transforming the data portion into the servo data pattern based on the control portion.

A further implementation according to this disclosure further includes a processor that generates the servo instruction.

A further implementation according to this disclosure further includes a pattern store that stores pre-programmed servo data patterns; wherein the processor generates the pre-programmed servo data patterns and writes them into the pattern store, and the controller processes the servo instruction by following a command in the control portion to use the data portion as an index to retrieve one of the pre-programmed servo data patterns from the pattern store.

A further implementation according to this disclosure further includes a buffer; wherein the controller transfers the servo data pattern to the data storage medium by storing the servo data pattern in the buffer, and writing the servo data pattern from the buffer to the data storage medium.

In a further implementation according to this disclosure, the controller waits, before the writing, until content of the buffer reaches a first capacity threshold.

In a further implementation according to this disclosure, the controller stops the writing when the content of the buffer reaches a second capacity threshold.

In accordance with another implementation of this disclosure, there is provided a system for writing servo data. The system includes a processor that generates a servo instruction, the servo instruction comprising a control portion and a data portion, a memory that stores the servo instruction, and a data storage device. The data storage device includes a data storage medium, and a controller that reads the servo instruction from the memory, processes the servo instruction to generate a servo data pattern from the data portion based on the control portion, and transfers the servo data pattern to the data storage medium.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

This disclosure describes a method, apparatus and system for more flexibly supplying the servo wedge patterns to be written to the storage medium of a storage device. According to this disclosure, the aforementioned hard coding, or dedicated circuits or state machines, are replaced by a set of instruction words that may be stored, e.g., in RAM, and inserted into the data stream when needed. Each such instruction word includes a control instruction portion and an operational data portion on which the control instruction acts. As discussed further below, the servo patterns may be easily changed by writing new instructions to RAM which can then be inserted into the self-servo-write (SSW) data stream.

Figure 1:
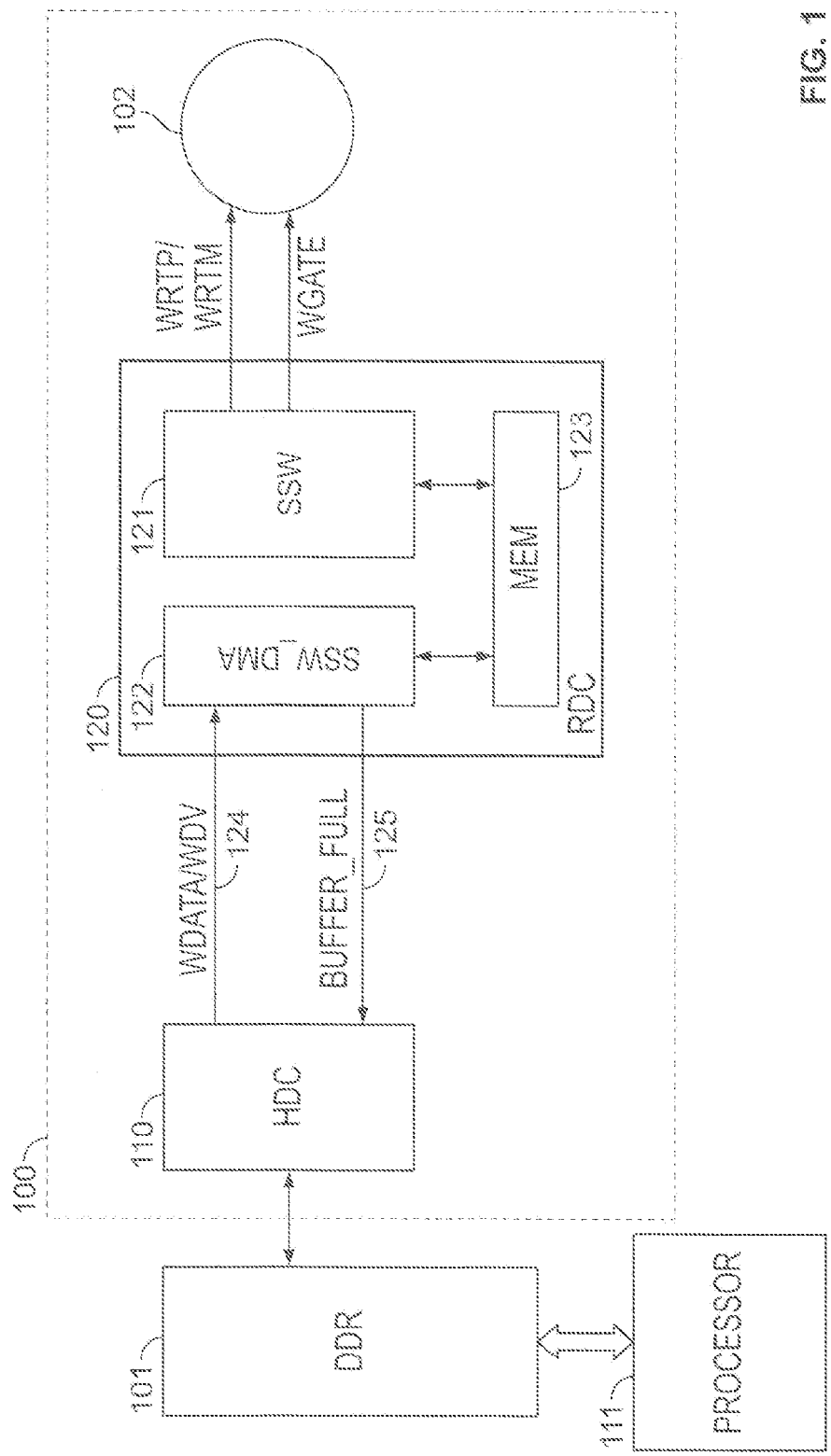
FIG. 1 shows a schematic representation of a data channel of a storage device to which the present disclosure may be applied.

FIG. 1 is a schematic representation of a data channel 100 of a storage device to which self-servo-write signals may be applied. Generally, data channel 100 transfers data in both directions between an external RAM or other memory (e.g., DDR memory) 101 and a storage medium 102 (which in the case of a magnetic disk drive is the magnetic disk platter itself). External memory 101 may be written to or read from by an external processor 111. Data channel 100 includes a controller 110 and read-data channel 120 (although it may be used for writing as well), which includes an SSW module 121, a self-servo-write direct memory access (SSW_DMA) controller 122 and a buffer (MEM) 123. The data are written on line 103 under control of WRITE_GATE (WGATE) signal 104. As shown, line 103 is a differential signal line, but single-ended signaling also could be used.

In SSW mode, the user (i.e., the storage device manufacturer) causes SSW data to be stored in external memory 101. As noted above, traditionally such storage has been accomplished by hard coding the desired self-servo-write patterns or by using a complex state machine. However, in accordance with embodiments of this disclosure, the desired self-servo-write patterns may be stored in external memory 101 by external processor 111, as detailed below.

Once the desired patterns have been stored in external memory 101, it is streamed by controller 110 through the write-data (WDATA) pin 124 via SSW_DMA controller 122 to buffer 123. Once there are sufficient SSW data in buffer 123, a BUFFER_FULL signal 125 may be asserted. Once BUFFER_FULL signal 125 has been asserted, controller 110 is expected to stop streaming in additional data within a specific number of write clock (WCLK) cycles (e.g., 16 WCLK cycles). In such an example, up to 16 WCLK cycles' worth of additional data may be loaded after BUFFER_FULL is asserted.

Once buffer 123 is full (i.e., transfer of the servo wedge data is complete, or the wedge is larger than buffer 123) and the SSW channel reaches write target, SSW module 121 can initiate the writing process. SSW module 121 will stop the writing process when an End-Of-Write (EOW) flag is detected in the data. The BUFFER_FULL signal may be de-asserted once writing begins (and at least some data has been read out of buffer 123) or after the write operation is completed. Either way, once the BUFFER_FULL signal has been de-asserted, controller 110 can resume streaming data into buffer 123.

Figure 2:
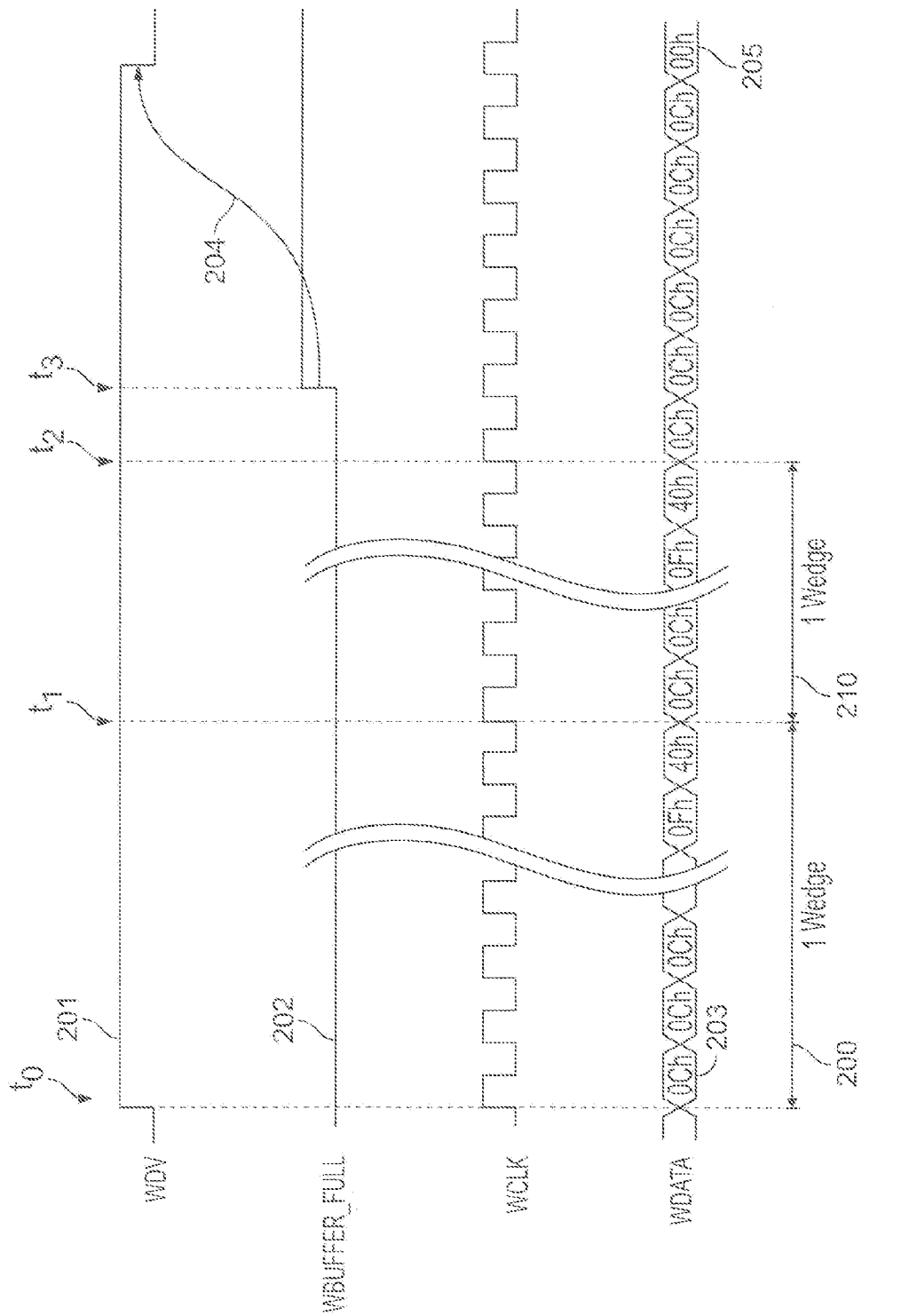
FIG. 2 shows an example of the writing of servo data to a channel such as that of FIG. 1.
Figure 3:
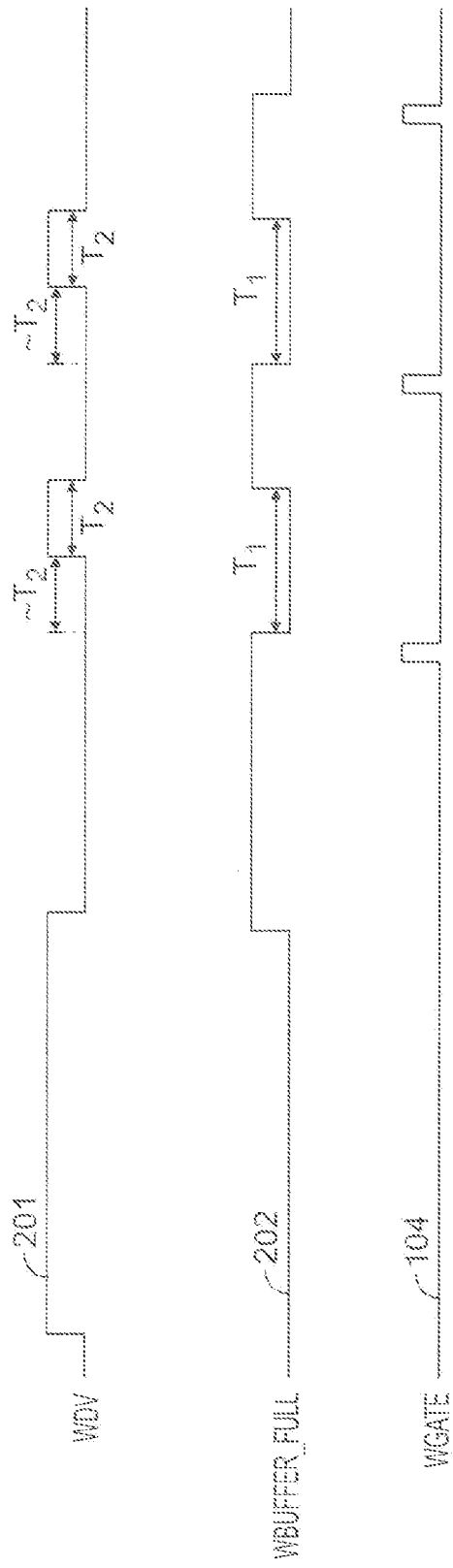
FIG. 3 is a timing diagram of control signals for the writing example of FIG. 2.

An example is diagrammed in FIGS. 2 and 3. As can be seen, in the writing to buffer 123 of data for a first servo wedge 200, at time $t_0$ of the write clock WCLK, WRITE_DATA_VALID (WDV) signal 201 is asserted. At that time, WRITE_BUFFER_FULL (WBUFFER_FULL) signal 202 is not asserted, and therefore the data 203 on the WRITE_DATA (WDATA) pin are written to buffer 123 via SSW_DMA controller 122.

At time $t_1$, when writing to buffer 123 of data for a second servo wedge 210 begins, WRITE_BUFFER_FULL (WBUFFER_FULL) signal 202 has not been asserted, and therefore the data 203 on the WRITE_DATA (WDATA) pin continue to be written to buffer 123 via SSW_DMA controller 122. When writing to buffer 123 of data for second servo wedge 210 ends at time $t_2$, and WRITE_BUFFER_FULL (WBUFFER_FULL) signal 202 still has not been asserted, controller 110 attempts to write data 203 for a third servo wedge to buffer 123. However, shortly thereafter, at time $t_3$, WRITE_BUFFER_FULL (WBUFFER_FULL) signal 202 is asserted because write buffer 123 reaches a predetermined threshold portion of its capacity (as noted above, it can take several write clock cycles for SSW_DMA controller 122 to stop writing data to write buffer 123, so WRITE_BUFFER_FULL (WBUFFER_FULL) signal 202 should be asserted before write buffer 123 is completely full). Accordingly, after a delay 204 following the assertion of WRITE_BUFFER_FULL (WBUFFER_FULL) signal 202, WRITE_DATA_VALID (WDV) signal 201 is de-asserted and controller 110 stops streaming data (note data '00h' at 205). As noted above, according to one example, delay 204 should be no longer than 16 write clock cycles.

As seen in FIG. 3, once WRITE_DATA_VALID (WDV) signal 201 has been de-asserted, eventually WRITE_GATE (WGATE) signal 104 will be asserted. The particular condition that causes WRITE_GATE (WGATE) signal 104 to be asserted may vary according to different implementations. Once WRITE_GATE (WGATE) signal 104 has been asserted, SSW module 121 begins writing data from buffer 123 to storage medium 102. In some implementations, WRITE_DATA_VALID (WDV) signal 201 may remain de-asserted until buffer 123 has been emptied. However, in the implementation shown in FIG. 3, WRITE_DATA_VALID (WDV) signal 201 remains de-asserted only until contents of buffer 123 fall below a second capacity threshold, which ideally is lower than the first capacity threshold that causes WRITE_DATA_VALID (WDV) signal 201 to be de-asserted (otherwise WRITE_DATA_VALID (WDV) signal 201 will continually toggle between the asserted and de-asserted states as one bit is written out and a new bit is written in).

Specifically, as seen in the implementation of FIG. 3, WRITE_BUFFER_FULL (WBUFFER_FULL) signal 202 is de-asserted almost immediately after WRITE_GATE (WGATE) signal 104 is asserted and writing begins. However, WRITE_DATA_VALID (WDV) signal 201 is not immediately re-asserted at that time. Rather, enough time is allowed to pass for the contents of buffer 123 fall below the second capacity threshold before WRITE_DATA_VALID (WDV) signal 201 is re-asserted. The second capacity threshold should be sufficient to allow new data to be written to the buffer without overwriting data that are still in the buffer and have not been written out to their destination, and without creating a buffer memory access conflict; the specific threshold will vary based on the particulars of the buffer.

Once WRITE_DATA_VALID (WDV) signal 201 has been re-asserted, and writing of data to buffer 123 resumes, the contents of buffer 123 will eventually again reach the first capacity threshold, causing WRITE_BUFFER_FULL (WBUFFER_FULL) signal 202 to be re-asserted, which in turn causes WRITE_DATA_VALID (WDV) signal 201 to again be de-asserted. This pattern continues until no more data are written to buffer 123. As can be seen, e.g., at 302 in FIG. 3, the time period $T_2$ that WRITE_DATA_VALID (WDV) signal 201 remains re-asserted is about one-half of the time period $T_1$ that WRITE_BUFFER_FULL (WBUFFER_FULL) signal 202 is de-asserted. That makes sense, if one assumes that the rate at which data are written out of buffer 123 is about the same as the rate at which data are written into buffer 123. Thus, for about the first half of period $T_1$, during a duration of about $T_2$, a certain amount of data sufficient to reduce the usage of buffer 123 from the first threshold to the second threshold is written out of buffer 123. Once data can again be written into buffer 123, it will take about the same duration $T_2$ for buffer 123 to again fill up to the first threshold, under the foregoing assumption that the rate at which data are written out of buffer 123 is about the same as the rate at which data are written into buffer 123.

A servo wedge may have minimum and maximum lengths. In one implementation, the minimum length of a servo wedge is 32 DiBits, while the maximum length is 1024 DiBits, while the number of instructions per DiBit may vary. In some implementations, the number of instructions should be a multiple of four, and the last instruction should end with either 1100 or 0100. One can assume a servo burst frequency of between about 50 MHz and about 200 MHz, and an average or nominal servo wedge length of 180 DiBits. Therefore one can compute a maximum data transfer time for one servo wedge of about 5.4 µs, which is fast enough to avoid impacting data transfer operations.

In accordance with an implementation of this disclosure, each servo data write byte is an instruction which can be transformed into a pattern of servo data, rather than a preprogrammed pattern. In such an implementation, the upper four bits [7:4] of the servo data write byte are a control instruction, while the lower four bits [3:0] of the servo data write byte are operational data. An example of a simple subset of possible instructions for the upper bits are:

| Instruction | Meaning |
| --- | --- |
| 0000b (0h) | Write the following pattern |
| 1000b (8h) | Write idle (continue sending data but de-assert WGATE) |
| 0100b (4h) | Last pattern write (write the following pattern, which is the last one in the current servo wedge) |
| 1100b (Ch) | Last pattern write idle (continue sending data but de-assert WGATE; this pattern is the last one in the current servo wedge) |

The four bits of operational data in the lower bits may be repeated to expand the pattern to a full byte. For example, depending on the implementation, each bit may be repeated, so that 1011 becomes 11 00 11 11, or each bit may be followed by its inverse, so that 1011 becomes 10 01 10 10.

As an example of a servo instruction stream, the preamble may be encoded as 1111_0000b. The corresponding instruction is 0000_1100b=0Ch, where, as described above, '0000' is an instruction to write the second portion, which is expanded from '1100' to the desired '1111_0000'.

The preamble may be followed by, e.g., a PES. One cycle of a half-rate PES may be encoded as '11111111_00000000b'. The corresponding instructions are '0000_1111b' followed by '0000_0000b', or '0Fh 00h'. The instruction for four such cycles would be '0Fh 00h 0Fh 00h 0Fh 00h 0Fh 00h'. The instruction stream for four such cycles where WGATE is inactive in two middle DiBits would be '0Fh 00h 8Fh 80h 8Fh 80h 0Fh 00h' ('8h' is equivalent to '1000b' and, as noted above, is the "write idle" control instruction).

In some cases, the length of the servo wedge may be required to be a certain size, and if the number of instructions causes the servo wedge to be smaller than that size, the instruction stream could be padded with dummy instructions. For example, if the length of the servo wedge should be a multiple of four instructions (e.g., four DiBits if there is one instruction per DiBit), then where the length of the user-defined instruction stream is 161 DiBits (not multiple of 4), the user would pad the instruction stream with three dummy instructions. In such an example, the last five instructions might look like:

| | Instruction No.: | | | | |
| --- | --- | --- | --- | --- | --- |
| | 160 | 161 | 162 | 163 | 164 |
| Instruction: | 0Fh | 00h | 8Fh | 80h | CFh |

Instructions nos. 162-165 are the padded instructions. While they continue the alternating pattern of all '1s' followed by all '0s', they also are "write idle" instructions, so no actual change in the servo wedge results from the padding.

In other implementations, the set of possible instructions may be expanded.

One instruction that may be included in an expanded instruction set may be a "long_pattern_write" instruction. If the user wants to include many repetitions of a single pattern, then rather than reissue the same instructions multiple times, a long_pattern_write instruction may be used. One example of a format for such an instruction would include two instruction words. The first instruction word would include in its upper bits a control instruction indicating a long_pattern_write, with the pattern to be written provided as the operational data in the lower bits (to be doubled upon writing as indicated above). The second instruction word would again include in its upper bits a control instruction indicating a long_pattern_write, but here the lower bits would indicate the number of repetitions of the operational data.

Another instruction that may be included in an expanded instruction set may be a "special_erase_mode" instruction. The upper bits could be a control instruction indicating the special_erase_mode, with the lower bits indicating the special erase type. One example of a special erase type could be a long erase, in which case a second instruction word would indicate the length of the erase period. Another example of a special erase type could be an erase mode in which a high-speed clock (which is faster than a maximum pattern frequency in the data) is used as an erase signal Still another instruction that may be included in an expanded instruction set can be an instruction to look up a preprogrammed pattern from a store of such patterns, which may be kept, e.g., in non-volatile RAM. This type of instruction allows commonly-used patterns to be generated and stored once, with a pointer in the instruction to the store of patterns—e.g., an index to a table. Thus, the upper bits could be a control instruction indicating that the pattern should be looked up in the store of patterns, with the lower bits indicating the index or location within the store of patterns. Moreover, the contents of the store of patterns could be changed without actually having to change the instruction word in the stream of instructions, which would still point to the same index.

Figure 4:
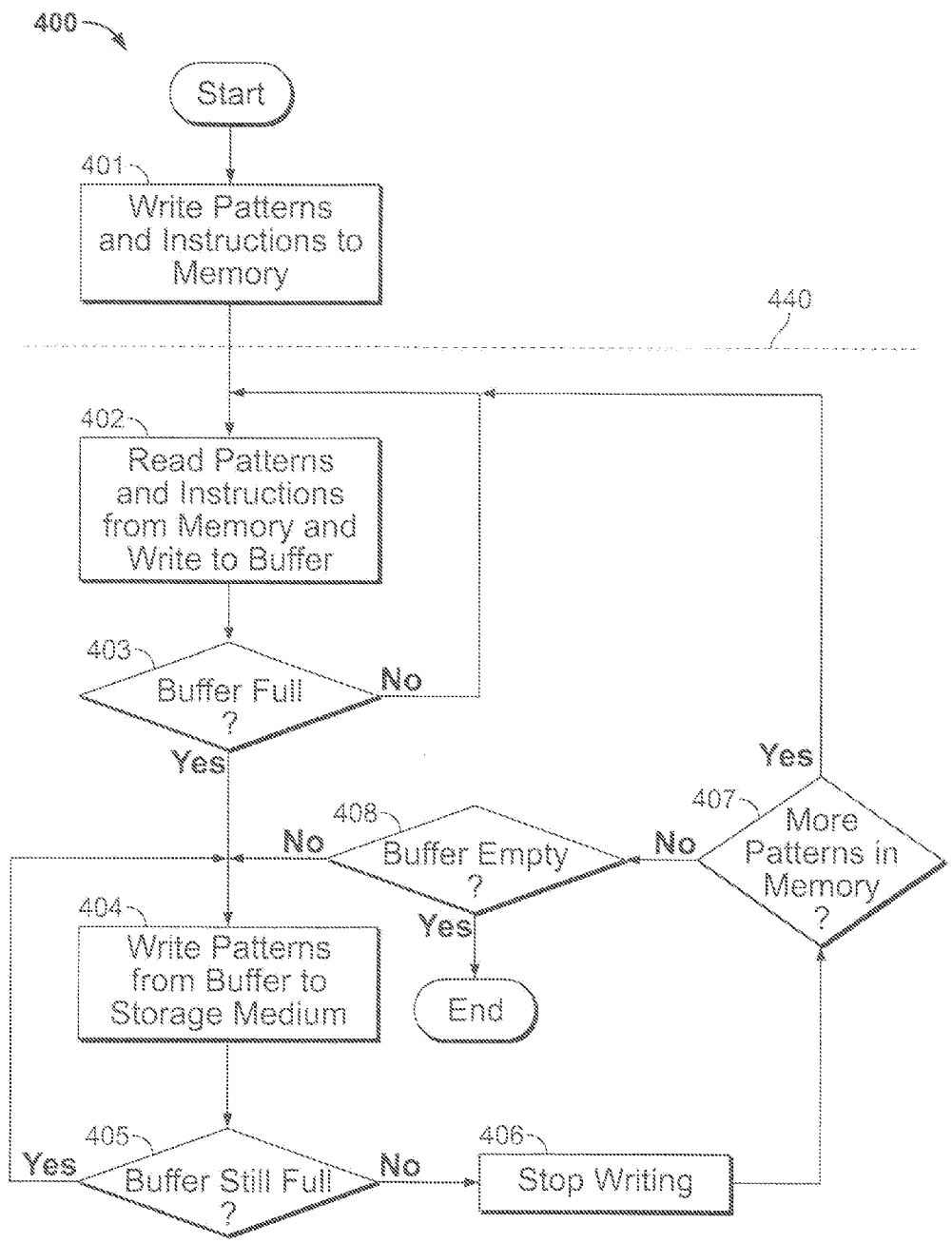
FIG. 4 is a flow diagram of an example of a method according to the present disclosure.

A method according to this disclosure is diagrammed in FIG. 4. Method 400 starts at 401 where self-servo-write patterns, and instructions as described above incorporating those patterns, are written to memory 101. The writing of patterns and instructions into memory 101 may take place immediately before the remainder of method 400, or may be separated in time by hours, days or longer from the remainder of method 400. This is indicated by dashed line 440.

At 402, method 400 resumes for self-servo writing of a particular storage medium 102 (regardless of how much time has passed since the writing of patterns and instructions into memory 101), and self-servo-write patterns and instructions are read from memory 101 by controller 110, which processes the instructions and writes the resulting patterns to buffer 123.

At 403, controller 110 determines whether buffer 123 is "full" (i.e., whether the portion of the capacity of buffer 123 that is in use exceeds the first threshold referred to above). If buffer 123 is not full, the method at 402 continues reading self-servo-write patterns and instructions from memory 101 and processing those instructions to write the patterns into buffer 123. When at 403 buffer 123 is full, then at 404 the self-servo-write patterns in buffer 123 are written to storage medium 102.

At 404, controller 110 also tests at 405 as to whether buffer 123 is still full while writing is occurring (i.e., whether the portion of the capacity of buffer 123 that is in use continues to exceed the second threshold, lower than the first threshold, referred to above). If buffer 123 is still full, then writing continues at 404. When at 405 buffer 123 is no longer full, then writing stops at 406 and at 407 it is determined whether there are more patterns and instructions in memory 101. If there are more patterns and instructions in memory 101, then method 400 returns to 402 and retrieves additional patterns and instructions from memory 101.

At 407, if it is determined that there are no more patterns and instructions in memory 101, then at 408 it is determined whether buffer 123 is empty. If buffer 123 is not empty, then method 400 returns to 404 to write more patterns from buffer 123 to storage medium 102. The loop through 404, 405, 406, 407 and 408 continues until it is determined at 408 that buffer 123 is empty, and method 400 ends.

Thus it is seen that a method, apparatus and system for more flexibly supplying the servo wedge patterns to be written to the storage medium of a storage device has been provided.

It will be understood that the foregoing is only illustrative of the principles of the disclosure, and that the disclosure can be practiced by other than the described implementations, which are presented for purposes of illustration and not of limitation, and the present disclosure is limited only by the claims which follow.

What is claimed is:

1. A method of writing servo data to a data storage medium, the method comprising:
   reading servo instructions from a memory that stores a plurality of servo instructions, each respective servo instruction comprising a respective control portion and a respective data portion;
   processing, in a controller, each servo instruction that is read, to generate a respective servo data pattern from each respective data portion based on each respective control portion; and
   transferring each respective servo data pattern to the data storage medium.

2. The method of claim 1 wherein the processing comprises, for at least one servo instruction that is read, transforming the respective data portion into the respective servo data pattern based on the respective control portion.

3. The method of claim 1 wherein the processing comprises, for at least one servo instruction that is read, following a command in the respective control portion to use the respective data portion as an index to retrieve a pre-programmed servo data pattern from a pattern store.

4. The method of claim 3 further comprising generating the pre-programmed servo data pattern after storing the servo instructions.

5. The method of claim 1 wherein the transferring comprises:
   storing each respective servo data pattern in a buffer; and
   writing each respective servo data pattern from the buffer to the data storage medium.

6. The method of claim 5 wherein the transferring further comprises waiting, before the writing, until content of the buffer reaches a first capacity threshold.

7. The method of claim 6 wherein the transferring further comprises stopping the writing when the content of the buffer reaches a second capacity threshold.

8. Apparatus for writing servo data to a data storage medium, the apparatus comprising:
   a processor that generates a plurality of servo instructions;
   a memory that stores the plurality of servo instructions, each respective servo instruction comprising a respective control portion and a respective data portion; and
   a controller that:
   reads at least one of the servo instructions from the memory,
   processes each servo instruction that is read to generate a respective servo data pattern from each respective data portion based on each respective control portion, and
   transfers each respective servo data pattern to the data storage medium.

9. The apparatus of claim 8 wherein the controller processes at least one servo instruction that is read by transforming the respective data portion into the respective servo data pattern based on the respective control portion.

10. The apparatus of claim 8 further comprising a pattern store that stores pre-programmed servo data patterns; wherein:
    the processor generates the pre-programmed servo data patterns and writes them into the pattern store; and
    the controller processes at least one servo instruction that is read by following a command in the respective control portion to use the respective data portion as an index to retrieve one of the pre-programmed servo data patterns from the pattern store.

11. The apparatus of claim 10 wherein the processor generates the pre-programmed servo data patterns and writes them into the pattern store while the controller processes the at least one servo instruction.

12. The apparatus of claim 8 further comprising a buffer; wherein:
    the controller transfers each respective servo data pattern to the data storage medium by:
    storing each respective servo data pattern in the buffer; and
    writing each respective servo data pattern from the buffer to the data storage medium.

13. The apparatus of claim 12 wherein the controller waits, before the writing, until content of the buffer reaches a first capacity threshold.

14. The apparatus of claim 13 wherein the controller stops the writing when the content of the buffer reaches a second capacity threshold.

15. A system for writing servo data, the system comprising:
    a processor that generates a plurality of servo instructions, each respective servo instruction comprising a respective control portion and a respective data portion;
    a memory that stores the plurality of servo instructions; and a data storage device comprising:
a data storage medium; and
a controller that:
reads at least one of the servo instructions from the memory,
processes each respective servo instruction that is read to generate a respective servo data pattern from the respective data portion of the respective servo instruction based on the respective control portion, and
transfers each respective servo data pattern to the data storage medium.

16. The system of claim 15 wherein the controller processes at least one servo instruction that is read by transforming the respective data portion into the respective servo data pattern based on the respective control portion.

17. The system of claim 15 further comprising a pattern store that stores pre-programmed servo data patterns; wherein:
the processor generates the pre-programmed servo data patterns and writes them into the pattern store; and
the controller processes each respective servo instruction by following a respective command in each respective control portion to use each respective data portion as an index to retrieve one of the pre-programmed servo data patterns from the pattern store.

18. The system of claim 17 wherein the processor generates the pre-programmed servo data patterns and writes them into the pattern store while the controller processes the at least one servo instruction.

19. The system of claim 15 further comprising a buffer; wherein:
the controller transfers each respective servo data pattern to the data storage medium by:
storing each respective servo data pattern in the buffer; and
writing each respective servo data pattern from the buffer to the data storage medium.

20. The system of claim 19 wherein the controller waits, before the writing, until content of the buffer reaches a first capacity threshold.

21. The system of claim 20 wherein the controller stops the writing when the content of the buffer reaches a second capacity threshold.

* * * * *